US005252243A

United States Patent [19]

Minns

[11] Patent Number: 5,252,243

[45] Date of Patent: Oct. 12, 1993

[54] CARPET CLEANING METHOD

[75] Inventor: Charles R. Minns, Williamsburg, Va.

[73] Assignee: BASF Corporation, Williamsburg, Va.

[21] Appl. No.: 462,919

[22] Filed: Jan. 8, 1990

Related U.S. Application Data

[63] Continuation-in-part of Ser. No. 206,531, Jun. 14, 1988, abandoned.

[51] Int. Cl.[5] .............................................. C09K 15/06

[52] U.S. Cl. ..................................... 252/102; 252/99; 252/186.29; 252/103; 252/104

[58] Field of Search ........... 252/95, 99, 104, DIG. 14, 252/186.31, 94, 156, , 102; 8/111, 137

[56] References Cited

U.S. PATENT DOCUMENTS

| | | | |
|---|---|---|---|
| 3,607,760 | 9/1971 | McIntyre | 252/104 |
| 4,347,149 | 8/1982 | Smith et al. | 252/102 |
| 4,497,725 | 2/1985 | Smith et al. | 252/102 |
| 4,539,130 | 9/1985 | Thompson et al. | 252/94 |
| 4,609,475 | 9/1986 | Hanlon et al. | 252/8.55 |

*Primary Examiner*—Prince Willis, Jr.
*Assistant Examiner*—John F. McNally
*Attorney, Agent, or Firm*—Karen M. Dellerman

[57] ABSTRACT

An aqueous cleaning composition suitable for removing stains, soils, or combinations thereof from synthetic polymer fibers. The composition finds particular application in removing coffee stains from fibers contained in textile products such as carpets. The composition has a pH in the range of from about 7.0 to about 12 and comprises a peroxyhydrate, i.e., hydrogen peroxide, and a water soluble alcohol having up to 5 carbon atoms, i.e., isopropyl.

8 Claims, No Drawings

CARPET CLEANING METHOD

This is a continuation-in-part of copending application Ser. No. 07/206,531 filed on Jun. 14, 1988, abandoned.

BACKGROUND OF THE INVENTION

A. Field of the Invention

This invention relates to aqueous cleaning compositions and, more particularly, relates to an aqueous cleaning composition having the ability to remove stains, soils, or combinations thereof from textile fibers.

B. Description of the Prior Art

Carpets containing synthetic polymer fibers are a popular floor covering for both residential and commercial applications. Such carpets are relatively inexpensive and have a combination of desirable qualities, such as durability, comfort, safety, warmth, and quietness.

Various types of synthetic polymer fibers are used in making carpets. Two popular synthetic polymer fibers utilized in carpets are polyamide fibers, such as nylon 6 and nylon 66, and polyester fibers.

The fibers contained in the carpets are severely and permanently stained or soiled when contacted, such as by inadvertent spilling, with certain artificial and natural colorants present in household items, such as tea, coffee beverages made from coffee beans, and soft drink beverages. Many of these colorants are acid dyes colorants, which cause the most severe stains. As a result thereof, carpets are sometimes replaced because of unsightly soiling or staining, even though the carpet has not been worn out.

The terms "stain and staining" as used herein with reference to synthetic fibers means discoloration of the fibers caused by a chemical reaction with a chemical substance. Acid dyes are representative of a staining material for nylon fibers.

The terms "soils" as used herein refers to both organic and inorganic matter which comes in contact with fibers and adhere thereto. Dirt particles, grease, oils, foods, and cosmetics are representative of materials referred to as soils that work their way onto and into various textile fibers.

The term "fiber" as used herein includes fibers of extreme or indefinite length (i.e. filaments) and fibers of short length (i.e. staple). The term "yarn" as used herein means a continuous strand of fibers.

In an attempt to prevent undesirable staining of fibers and, particularly, fibers contained in carpets, it has been proposed that the fibers be treated with an additive which coats the fiber and makes the fiber resistant to staining. Examples of such additives are condensation products made from aromatic sulfonic acids, and formaldehyde. Although such additives have been somewhat successful in imparting stain resistance, certain problems remain. For instance, many of the additives reduce staining of fibers, but do not totally eliminate it. In addition, traffic on carpet wears off the additives, which leaves the resulting fibers of the carpet with little or no protection against staining.

Colored food beverages, such as colored soft drink beverages, tea beverages, and coffee beverages made from coffee beans, present a serious staining problem to textile fibers. Coffee stains are particularly unsightly because of their dark brown color.

Various fluorochemicals have been applied to carpet fibers in order to reduce their water and oil wettability. The fluorochemical reduces the tendency of soils to adhere to the fibers, thereby making the removal of soils from the carpet fibers easier than if the fluorochemicals were omitted, but offers little protection to the carpet fibers from spills containing acid dye colorants unless the colorants are immediately removed from the fibers. In addition, traffic on the carpet wears off the fluorochemicals.

A number of cleaning solutions have been proposed in the past for removing stains and soils from fibers. For instance, volatile solvent dry-cleaning fluids have been proposed, but such fluids are less than satisfactory in removing water-soluble stains or soils. In addition, aqueous compositions containing synthetic detergents have been proposed for removing stains and soils from fibers, but such compositions have not been found to be particularly effective.

One of the problems with these cleaning solutions is that while they may, at times, loosen and/or dispense the soil, they fail to pick up or retain the soil, which results in it being redeposited on the fibers. Furthermore, they are not very effective against difficult stains, such as acid and coffee stains. Still further, since acid and coffee stains are not water soluble, aqueous detergent compositions are not particularly effective and many times it is difficult to remove all of the detergent from the fiber surface, even when rinsed with large amounts of water or steam. As a result thereof, the carpet fibers become tacky due to a film of detergent. The film attracts and retains soils, which results in a cleaned carpet that will soil more easily after a cleaning than prior thereto.

Finally, many of the aqueous cleaning compositions require large amounts of water. This causes the fibers in the carpet and, many times, the pad under the carpet, to become saturated with water, which can result in degradation of the pad and/or carpet.

The present invention provides a cleaning composition suitable for removing stains and soils from synthetic polymer fibers which overcomes, or at least mitigates, many of the abovedescribed problems.

SUMMARY OF THE INVENTION

The present invention is an aqueous cleaning composition and a method for removing stains, soils, or combinations thereof from fibers made from synthetic polymers utilizing the aqueous cleaning composition. The cleaning composition has a pH in the range of from about 7.0 to about 12.0 and comprises an oxidizing agent and a water-soluble aliphatic alcohol. The method of the invention is carried out by contacting the soiled and/or stained fiber with the cleaning composition.

The composition finds particular application in cleaning fibers contained in carpets, rugs, upholstery, drapes, clothing, and other similar textile products. Still further, the composition is very effective in removing stains from coffee beverages, even when the beverages have remained on the fiber for extended periods of time, e.g., 30 minutes or more. Finally, the use of the composition does not result in appreciably degrading the fibers.

DESCRIPTION OF THE PREFERRED EMBODIMENTS

Alcohols which are suitable for use in the invention include water-soluble alcohols containing up to 5 carbon atoms, such as methyl alcohol, ethyl alcohol, n-propyl alcohol, isopropyl alcohol, n-butyl alcohol, isobutyl alcohol, sec-butyl alcohol, tert-butyl alcohol, tert-pentyl alcohol. The preferred alcohol is isopropyl alcohol.

Oxidizing agents that find particular application in the invention include peroxyhydrates. The term "peroxyhydrate", as used herein, means hydrogen peroxide or any compound which, in an aqueous composition, yields hydrogen peroxide. Examples of such compounds include alkali metal peroxides, such as sodium peroxide and potassium peroxide, sodium perborate monohydrate and tetrahydrate, sodium persulfate, sodium percarbonate, sodium peroxydihydrate, various phosphate peroxyhydrates such as sodium or potassium peroxydiphosphate, potassium carbonate, peroxydihydrate, and organic peroxyhydrates such as urea peroxide. The preferred oxidizing agent is hydrogen peroxide.

The amount of oxidizing agent and alcohol utilized in the aqueous cleaning composition will vary over a wide range with no limitations in this regard. For fibers having stains from coffee beverages, the amount of oxidizing agent employed is generally an amount in the range of from about 3 to about 15 percent by weight of aqueous composition and, preferably, an amount of from about 3 to 12.5 percent by weight of aqueous composition. The amount of alcohol will generally be an amount in the range of from about 10 to about 30 percent by weight of aqueous composition and, preferably, an amount of from about 10 to about 20 weight percent based on the weight of the aqueous composition.

The precise manner that the aqueous composition functions to remove soils or stains, particularly coffee stains, is not fully understood and need not be. It is believed that the aqueous composition oxidizes colored high molecular compounds to colorless lower molecular weight compounds. In any case, the observable effect is that the utilization of the aqueous solution containing the peroxyhydrate and alcohol very effectively removes, or at least substantially reduces, soils and stains, particularly coffee stains, in the fibers. In addition, the alcohol appears to assist in the stain and soil removal and promotes drying of the cleaned fiber. The cleaning effect occurs without any appreciable detrimental effect to the fibers.

In the practice of the invention, it is necessary that the pH of the aqueous composition be in the range of from about 7.0 to about 12.0 and, more preferably, in the range of from about 9.0 to about 10.5. The pH can be adjusted using acidic or alkaline compounds well known in the art. The preferred compounds, for raising the pH of the composition are sodium hydroxide, potassium hydroxide, and, most preferably, ammonium hydroxide.

The preferred aqueous composition has a pH of from about 9.0 to about 10.0 and comprises hydrogen peroxide present in an amount in the range from about 3 to about 12.5 percent by weight of aqueous composition and isopropyl alcohol present in an amount in the range from about 15 to about 20 percent by weight of aqueous composition.

The most preferred composition comprises about 9 percent by weight hydrogen peroxide, 10 percent by weight isopropyl alcohol, and a pH of about 9.5. Preferably, pH adjustment of this composition is carried out using ammonium hydroxide.

Generally, any synthetic fiber may be cleaned utilizing the cleaning composition of the present invention. Examples of such fibers include those made from synthetic thermoplastic polymers which are capable of being formed into fibers such as by melt extrusion including polyolefins, for example, homopolymers of olefins such as low-density polyethylene, high-density polyethylene, polypropylene, and the like. Copolymers of olefins with other ethylenically unsaturated monomers such as ethylene-propylene copolymers and ethylenebutene copolymers and the like find particular application in the present invention.

Fibers made from polyamides also find particular application in the present invention. Examples of such polyamides include homopolyamides and copolyamides which are obtained by the polymerization of lactam or aminocaprionic acid or a copolymerization product from mixtures of diamines together with dicarboxylic acids or mixtures of lactams.

Typical polyamides include nylon 6, nylon 6/6, nylon 6/10, nylon 6/12, nylon 11, nylon 12, copolymers thereof, or mixtures thereof. Polyamides can be also copolymers of nylon 6 or nylon 6,6 and a nylon salt obtained by reacting a dicarboxylic acid component such as terephthalic acid, isophthalic acid, adipic acid or sebacic acid with a diamine such as hexamethylenediamine or 1,4-bisaminomethylcyclohexane.

Fibers made from polyester also find particular application in the present invention. The preferred polyesters are the linear terephthalate polyesters, i.e., polyesters of a glycol containing from 2 to 20 carbon atoms and a dicarboxylic acid component comprising at least about 75% terephthalic acid. The remainder, if any, of the dicarboxylic acid component may be any suitable dicarboxylic acid such as sebacic acid, adipic acid, isophthalic acid, sulfonyl-1,4-4-dibenzoic acid, or 2,8-dibenzofurandicarboxylic acid. Examples of linear terephthalate polyesters which may be employed include poly(ethylene terephthalate), poly(butylene terephthalate), poly(ethylene terephthalate/5-chloroisophthalate), poly(ethylene terephthalate), poly(butylene terephthalate), poly(ethylene terephthalate/5-chloroisophthalate), poly(ethylene terephthalate/5-[sodium sulfo]-isophthalate), and poly(cyclohexane-1,4-dimethylene terephthalate/hexahydroterephthalate).

Fibers comprising polyacrylonitrile homopolymers and copolymers can also be utilized in the present invention. The term "polyacrylonitrile" as used herein means a synthetic polymer composed of at least 85 percent by weight acrylonitrile monomer units $$(-CH_2-\underset{\displaystyle CN}{\underset{|}{CH}}-).$$

Up to 15 percent of the polymer can be comprised of a vinyl monomer which is copolymerizable with acrylonitrile such as methyl acrylate, methyl methacrylate, vinyl acetate, and vinyl derivatives containing sulfo or carboxyl groups.

The aqueous composition can be prepared by mixing together the alcohol, oxidizing agent, and water in any order. Prior to utilizing the composition, its pH will usually have to be adjusted.

The method of cleaning using the cleaning composition comprises applying the aqueous composition to the fibers to be cleaned and removing the residue of the composition together with stain, soil, or combinations thereof. The residue may be removed by rinsing, scrubbing, vacuuming, sweeping, brushing, and the like. The amount of aqueous composition applied will depend on the severity of the staining or soiling encountered. For severe staining or soiling, more than one application of the cleaning composition may be desired. In addition, the cleaning composition should remain on the fibers for a period of time that insures proper cleaning of the stains, soils, or combinations thereof. After removing the composition from the fibers, the fibers are preferably washed with water to thoroughly remove the cleaner.

A desirable feature of utilizing the composition for cleaning soiled and/or stained fibers is that efficacious cleaning occurs thereon without leaving a residue. In addition, the use of the cleaning composition does not impair the color, even dyed colors, of the fibers.

The invention is further exemplified by the examples below, which are presented to illustrate certain specific embodiments of the invention, but are not intended to be construed so as to be restrictive of the spirit and scope thereof.

EXAMPLE

An amount of 10 milliliters of a beverage comprising black coffee which had a temperature of 180° F was poured into the center of each piece of a 6 inch by 6 inch sample of a commercial carpet. The samples comprised nylon, polyester, or polypropylene. The samples were then allowed to air dry at ambient temperatures for a period of 48 hours. After 48 hours, each stain was sprayed with a commercial carpet detergent. The detergent was allowed to contact the sample for a period of one minute after being lightly agitated by means of a finger. Thereafter, the detergent was removed from the sample using a commercial hot water extraction machine having a 4 inch wand attached to a vacuum hose. Next, the stain was sprayed with 100% white vinegar, which was allowed to stand for one minute and subsequently removed from the carpet in the same manner as the detergent. The coffee stains were not appreciably removed from the samples after these treatments.

Thereafter, each coffee stain was sprayed with an aqueous cleaning composition comprising 10 percent by weight isopropyl alcohol, 30 percent by weight of an aqueous hydrogen peroxide composition containing 30 percent by weight hydrogen peroxide (9 percent by weight hydrogen peroxide), 10% by weight of an ammonium hydroxide for pH adjustment, and 50 percent by weight of water. The percentages of the alcohol, hydrogen peroxide, ammonium hydroxide were based on the total weight of the cleaning composition. The stains were no longer visible after less than one hour. The aqueous coffee stain removing composition (CAGS) was extracted from the samples, rinsed with an aqueous solution containing 50% by weight white vinegar and 50% by weight water, and allowed to dry. Upon visual observation, all traces of the coffee stain were removed from each sample.

Although certain preferred embodiments of the invention have been herein described for illustrative purposes, it will be appreciated that various modifications and innovations of the procedures recited may be effected without departure from the basic principles which underlie the invention. Changes of this type are therefore deemed to lie within the spirit and scope of the invention except as may be necessarily limited to the amended claims of reasonable equivalents thereof.

What is claimed is:

1. A method of spot cleaning coffee beverage stained or soiled portions of a synthetic polymer fiber carpet comprising:

contacting said stained or soiled portion with an effective amount of an aqueous cleaning composition having a pH in the range of from about 9 to about 12.0 and consisting essentially of:

(a) an amount of water-soluble alcohol containing 1 to about 5 carbon atoms;

(b) an oxidizing agent present in an amount in the range of from about 3 to about 15 percent by weight of said aqueous cleaning composition and comprising a peroxyhydrate;

(c) a pH adjustment substance; and (d) the balance water.

2. The method recited in claim 1 wherein said water-soluble alcohol is selected from the group consisting of methyl alcohol, ethyl alcohol, n-propyl alcohol, isopropyl alcohol, n-butyl alcohol, isobutyl alcohol, sec-butyl alcohol, tert-alcohol, tert-pentyl alcohol, and mixtures thereof.

3. The method recited in claim 2 wherein said peroxyhydrate is selected from the group consisting of hydrogen peroxide, sodium peroxide, potassium peroxide, sodium perborate monohydrate, sodium perborate tetrahydrate, sodium persulfate, sodium percarborate, sodium peroxydihydrate, sodium peroxydiphosphate, potassium peroxydiphosphate, potassium carbonate peroxydihydrate, urea peroxide, and mixtures thereof.

4. The method recited in claim 3 wherein said synthetic polymer fibers are selected from the group consisting of polyamide, polyester, and polyolefin fibers.

5. The method recited in claim 4 wherein said pH of said composition is in the range of from about 9.0 to about 10.5.

6. The method recited in claim 5 wherein said alcohol is present in said composition in an amount up to about 20 percent by weight of said composition and said peroxyhydrate is present in an amount in the range of from about 3 to about 15 percent by weight of said composition.

7. The method recited in claim 6 wherein said peroxyhydrate is hydrogen peroxide and said alcohol is isopropyl alcohol.

8. The method recited in claim 7 wherein said alcohol is present in an amount of about 10 percent based on the weight of said composition and said peroxyhydrate is present in an amount of about 9 percent based on the weight of said composition and said pH of said composition is adjusted using ammonium hydroxide.

* * * * *